(12) United States Patent  
Ricehouse

(10) Patent No.: US 11,780,274 B2  
(45) Date of Patent: *Oct. 10, 2023

(54) WHEEL BEADLOCK DESIGN

(71) Applicant: Wheel Pros, LLC, Greenwood Village, CO (US)

(72) Inventor: Daniel I. Ricehouse, Phoenix, AZ (US)

(73) Assignee: Wheel Pros LLC, Greenwood Village, CO (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/134,409

(22) Filed: Dec. 27, 2020

(65) Prior Publication Data

US 2021/0221182 A1 Jul. 22, 2021

Related U.S. Application Data

(60) Provisional application No. 62/989,079, filed on Mar. 13, 2020, provisional application No. 62/962,705, filed on Jan. 17, 2020.

(51) Int. Cl.
*B60C 15/02* (2006.01)
*B60B 25/12* (2006.01)
*B60B 25/20* (2006.01)
*B60B 25/04* (2006.01)
*B60B 23/06* (2006.01)

(52) U.S. Cl.
CPC .......... *B60C 15/0213* (2013.01); *B60B 25/04* (2013.01); *B60B 25/045* (2013.01); *B60B 25/12* (2013.01); *B60B 25/20* (2013.01); *B60C 15/0216* (2013.01); *B60B 23/06* (2013.01); *B60B 2320/10* (2013.01)

(58) Field of Classification Search
CPC . B60C 15/0216; B60C 15/0213; B60B 25/04; B60B 25/045
See application file for complete search history.

(56) References Cited

U.S. PATENT DOCUMENTS

| | | | | |
|---|---|---|---|---|
| 4,142,569 | A * | 3/1979 | Walther | B60B 25/14 301/23 |
| 4,502,521 | A * | 3/1985 | Tavazza | B60B 21/10 152/379.5 |
| 6,401,773 | B1 * | 6/2002 | Cho | B60C 17/041 152/398 |
| 8,196,625 | B1 * | 6/2012 | Chenoweth | B60B 7/01 152/186 |
| D952,450 | S * | 5/2022 | Ricehouse | D8/387 |

(Continued)

*Primary Examiner* — Scott A Browne
(74) *Attorney, Agent, or Firm* — Eric Hanscom

(57) ABSTRACT

An improved clamping mechanism to secure a tire between a bead ring and a wheel utilizing a bolt is provided. The bolt has a ball seat that pivots within an enlarged pilot hole in the bead ring as the bolt threads engage in threaded section of the wheel, pulling the bead ring toward the wheel. As the bead ring is tightened upon the wheel, eventually the bead ring contacts a fulcrum on the wheel, at which point the outer edge of the bead ring is leveraged against the tire bead bundle and pressing down the tire bead to lock it in place against the wheel. As the bead ring can pivot within the enlarged pilot hole around the bolt, the bolt is not stressed. Further, the wheel comprising a safety bead and non-skid coating on the inner wall of the wheel to prevent the wheel sliding around the wheel.

20 Claims, 18 Drawing Sheets

(56) References Cited

U.S. PATENT DOCUMENTS

| | | | |
|---|---|---|---|
| D956,544 S * | 7/2022 | Ricehouse | D8/387 |
| 2005/0089646 A1* | 4/2005 | Endicott | B60C 15/024 |
| | | | 427/446 |
| 2009/0151876 A1* | 6/2009 | Rider | B60B 25/12 |
| | | | 157/1.33 |
| 2013/0147255 A1* | 6/2013 | Rider | B60B 21/125 |
| | | | 301/23 |
| 2013/0287519 A1* | 10/2013 | Weiss | F16B 35/048 |
| | | | 411/147 |
| 2018/0104985 A1* | 4/2018 | Buck | B60B 25/20 |
| 2020/0122503 A1* | 4/2020 | Taylor | B60B 25/08 |
| 2021/0221171 A1* | 7/2021 | Ricehouse | B60B 23/10 |
| 2021/0254652 A1* | 8/2021 | Horiuchi | F16B 33/02 |
| 2023/0019947 A1* | 1/2023 | Ricehouse | F16B 43/001 |

* cited by examiner $F_{bead} = F_{bolt} - F_{fulcrum}$
$M_{bolt} = F_{bead} \times d - F_{fulcrum} \times c$ $F_{bead} = h \times F_{bead}$
$= F_{bolt} - F_{abutment}$
$M_{bolt} = F_{bead} \times d$ $F_{bead} = F_{bolt}$
$M_{bolt} = F_{bead} \times d$
$F_{blot} \times d$

WHEEL BEADLOCK DESIGN

CROSS REFERENCE TO RELATED APPLICATIONS

This application claims priority to U.S. Provisional Application No. 62/962,705, filed Jan. 17, 2020, and to U.S. Provisional Application No. 62/989,079, filed Mar. 13, 2020, the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of securing tires to wheels. More specifically, the invention relates to a bolt with a revolutionary ball seat that allows a bead ring with an elongated hole to pivot around the bolt while the bolt tightens a bead ring against a wheel to effectively secure a tire to the wheel, and to a method of preventing a tire from moving inward from an inner rim of the wheel as well as not slipping around the wheel as the vehicle accelerates or decelerates.

Brief Description of Invention

In one embodiment, the invention comprises improved bolts and bead rings, which in turn create an improved clamping mechanism to secure a tire between the bead ring and the wheel. The bead ring includes a bead ring ball seat manufactured into it with an elongated pilot hole. The bolt has a head, a ball seat, a thread and a bolt pilot. The threads engage with a threaded section on the wheel. The threads can be any diameter and density of threads per inch. The ball seat bolt nestles with the bead ring ball seat, allowing the bead ring to pivot as the bolt threads engage with the threaded section in the wheel, pulling the bead ring toward the wheel to secure the tire bead in between the wheel and the bead ring. As the bead ring is forced down upon the wheel through rotation of the bolt, eventually the bead ring contacts a pivot point on the wheel, at which point the outer edge of the bead ring is leveraged against the tire bead bundle, pressing down upon the tire bead to lock it in place against the wheel. Because the bead ring can pivot about the bolt within the ball seat and elongated pilot hole, the bolt is not stressed as in the prior art.

In another embodiment, the barrel of the wheel also has an improved safety bead that prevents the tire from moving away from the bead seat of the wheel. The area between the safety bead and the outer lip of the wheel (tire bead seat area) receives a measured (RA) surface roughness finish process to achieve the maximum co-efficient of rubber to aluminum that prevents the wheel from slipping rotationally inside the tire as the tire revolutions are quickly increased or decreased as it often the case in auto racing.

In a third embodiment, the invention provides a washer with a ball seat to be attached to the bead ring. The means of attachment obviously has to be very secure, so welding the washers around existing pilot holes in an existing wheel is a preferred embodiment of the invention. Because the washer has a ball seat, one of the bolts described more fully in this invention can be used to pivotally secure the bead ring over the tire bead bundle against the wheel.

Statement of the Problem

The open edge of a tire is called a tire bead and in the middle of the tire bead is called a tire bead bundle. The tire bead bundle is usually made of metal or some other non-compressible material. As tires wear, they need to be replaced. To effectively seal a new tire over a wheel, the tire bead bundle has to be clamped between the wheel and a bead ring, with several bolts extending through pilot holes in the bead ring and having threads that engage with threaded sections in the wheel. The bolt has to withstand considerable stress as it has to clamp the tire bead bundle in between the bead ring and the wheel with enough pressure such that air does not escape the tire.

As the bead ring is tightened on the wheel, the bolt has to undergo significant stress as the angle between the bead ring and the wheel is not consistently parallel, commonly referred to as joint face angularity, even the smallest angularity errors can have a catastrophic effect of the fatigue life of a bolt. This is particularly true for the bolt head, which is often, for at least part of the process, pressing against the bead ring at an angle such that only a portion of the bolt head is touching the bead ring. This problem is particularly acute in fields such as racing and off-road tire installation, where time is essential and workers do not take time to worry about the stress they may be placing on the bolt head. One problem faced is in tire installation during bolt snapping, the bolt head is no longer keeping the tire bead bundle compressed between the bead ring and wheel; therefore air may escape to flatten the tire, or an asymmetry of the wheel may cause other bolts to break, resulting the tire completely falling off from the wheel. When this happens in a racing car, it can be catastrophic for both the driver of that car and any nearby drivers.

Another problem faced by automobile owners, particularly race car drivers, as that when a tire is raced with low psi, there are two tendencies that can lead to catastrophic tire failure. First, with very little psi to hold the tire bead of the tire against the wheel, it is easy for the tire to move inward from the inner rim of the wheel and de-bead. This can lead to rapid deflation of the tire or a severe tire imbalance, causing tire failure. Second, with low psi tires, as the driver rapidly accelerates or decelerates the vehicle, the tire has a tendency to "spin around" on the wheel so the tire and wheel no longer rotate as one, as there is nothing to lock it against the barrel and inner rim of the wheel. This dual rotation can put an unacceptable amount of stress on the sidewall of the tire, resulting in catastrophic failure of the tire sidewall construction.

The prior art has several examples of attempts to resolve these problems. For example, the bead ring is bolted down upon the wheel by a non-pivoting bolt where this is no pivot point for additional leverage. Another example is found in U.S. Pat. No. 9,481,205 to Rider, et. al., which illustrates a device with a threaded stud rather than a traditional bolt. However, the device neither addresses the problem of stressors upon non-pivoting bolts nor provides the additional benefits of leveraging the bead ring upon the wheel that is taught by the current invention.

Thus, there has existed a need for a better means by which a tire bead can be secured between a bead ring and a wheel and prevented from moving inward from the bead seat of a wheel or rotationally spinning around on the wheel.

Statement of the Invention

In order to solve the above problems, the present invention provides a solution by utilizing a bolt about which a bead ring can pivot and a fulcrum on a wheel that can be leveraged upon to achieve a superior seal between a bead ring and a wheel over a tire bead. The bead ring is manufactured with a number of bead ring holes, each of which has a bead ring seat and an elongated pilot hole, which allows the bead ring to pivot around the bolt which being tightened. The bolt has a head, a ball seat, a threaded section, or thread, and a bolt pilot. The ball seat mates with the bead ring seat and the pilot hole in the bead ring is elongated greater than the diameter of the thread section of the bolt allowing the bead ring to pivot several degrees on either side of the bolt as the bolt threads engage threads in the wheel to prevent threading of the bead ring, pulling the bead ring toward the wheel. As the bead ring is tightened on the wheel, eventually the bead ring contacts a fulcrum on the wheel, at which point the outer edge of the bead ring is leveraged against the tire bead bundle and pressed down upon the tire bead to lock it in place against the wheel. Because the bead ring can pivot about the bolt within the elongated pilot hole, the bolt is not stressed in joint face angularity or threading as in the prior art and provides a more secure attachment of the tire to the wheel.

The invention additionally comprises a safety bead on the barrel of the wheel close to the inner rim. This prevents the tire from moving toward the center of the wheel, a problem particularly acute with low psi tires such as those found on sprint cars and dragsters. In between the safety bead and the inner rim, a measurable surface (RA) finish is created to the maximum coefficient of friction of rubber to aluminum, to prevent the tire from rotationally slipping around the wheel as the car accelerates and decelerates.

It is therefore an object of the present invention to provide a superior mechanism by what a tire can be attached to a wheel.

An additional object of the invention is to provide a bead ring with a bead ring seat and an elongated pilot hole that will allow the bead ring to pivot around a bolt as it is screwed into a wheel.

A further object of the invention is to provide a wheel with a fulcrum, against which a bead ring can be leveraged.

Another object of the invention is to provide a superior method of securing a tire in a wheel, including tires used in race cars, off-road vehicles, airplane wheels.

Another object of the invention is to provide a "safety bead" on the barrel of the wheel close to the inner rim to prevent the tire from moving toward the center of the wheel, a problem particularly acute with low psi tires.

A further object of the invention is to provide the maximum coefficient of friction surface (Measured RA) finish between the safety bead and the wheel bead seat to prevent rotational tire-slip around the wheel as the car accelerates and decelerates.

A final object of the invention is to provide a bolt with a ball seat where the ball seat can mate with a bead ring seat and allow the bead ring to pivot about the bolt through an elongated-pilot hole as it is being screwed into a threaded bolt hole in a wheel to prevent joint face angularity and threading.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
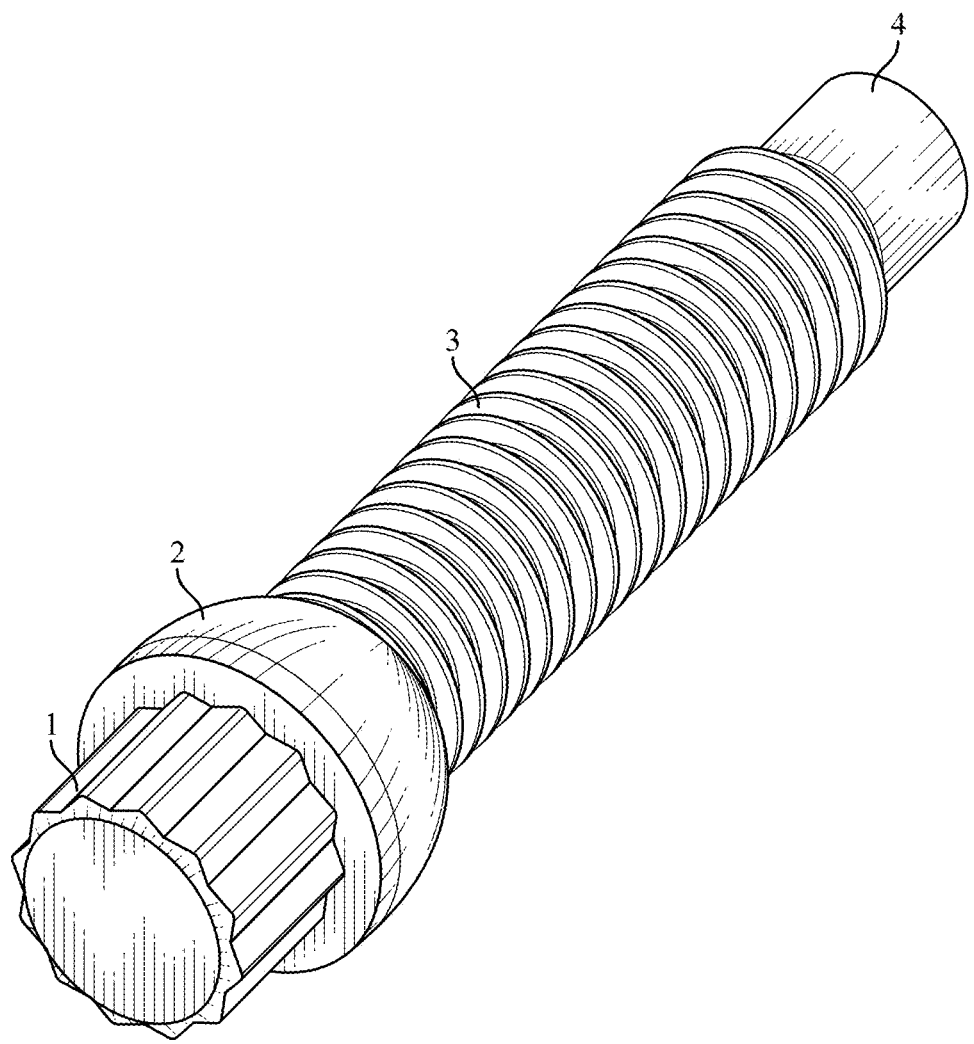
FIG. 1 is a perspective view of a bolt according to a preferred embodiment of the invention.
Figure 2:
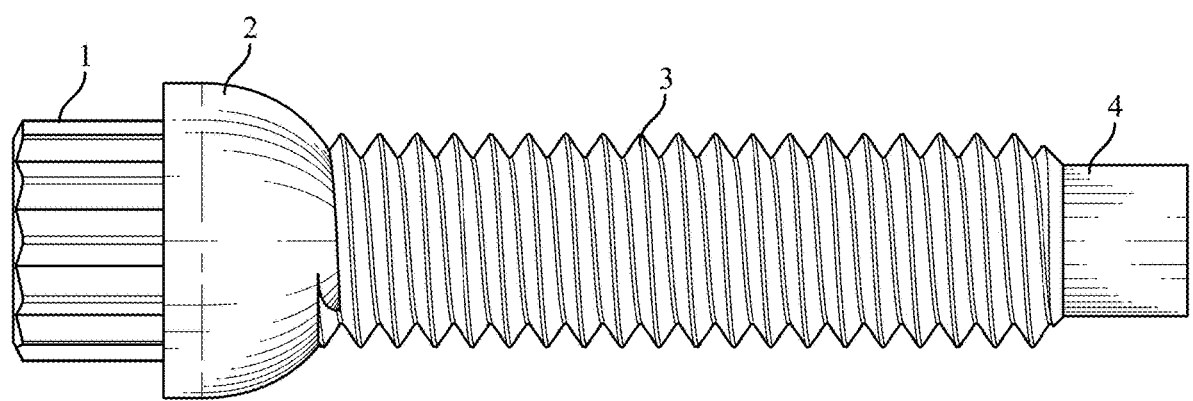
FIG. 2 is a side view of a bolt according to a preferred embodiment of the invention.
Figure 3:
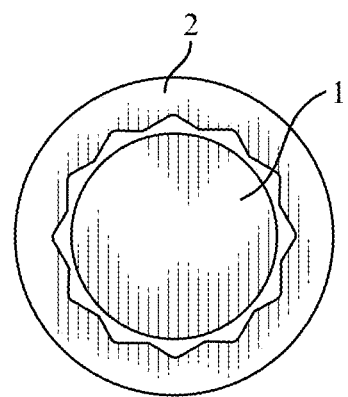
FIG. 3 is top view of a bolt according to a preferred embodiment of the invention.
Figure 4:
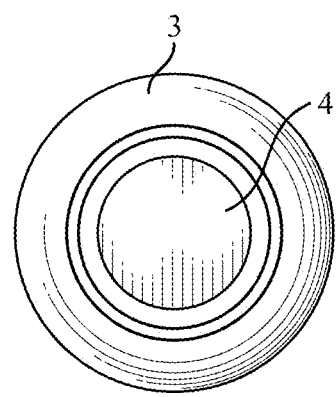
FIG. 4 is a bottom view of a bolt according to a preferred embodiment of the invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

In a preferred embodiment of the present invention provides improved bolts and bead rings for creating an improved clamping mechanism to secure a tire between the bead ring and the wheel.

In more details, referring now to the invention in FIG. 1, FIG. 2, FIG. 3 and FIG. 4 illustrate perspective, side, top and bottom view respectively of a bolt according to a preferred embodiment of the invention. The bolt has a head 1 (which has at least three sides, preferably twelve points), a ball seat 2 (which is the portion of the bolt that nestles in a bead ring seat), a thread 3 (which can be any diameter and with any number of threads per inch), and a bolt pilot 4. The head 1 is a hexagonal in shape. The head 1 can be made with any configuration of sides, ranging from a three-sided triangle to the 12-sided version as shown here.

The thread 3 has a diameter. The threads can be any diameter and density of threads per inch. Some examples of bolt with varying threads diameter according to embodiments of the invention are shown in FIG. 5a, FIG. 5b, FIG. 6a, FIG. 6b, FIG. 7a and FIG. 7b.

Figure 5A:
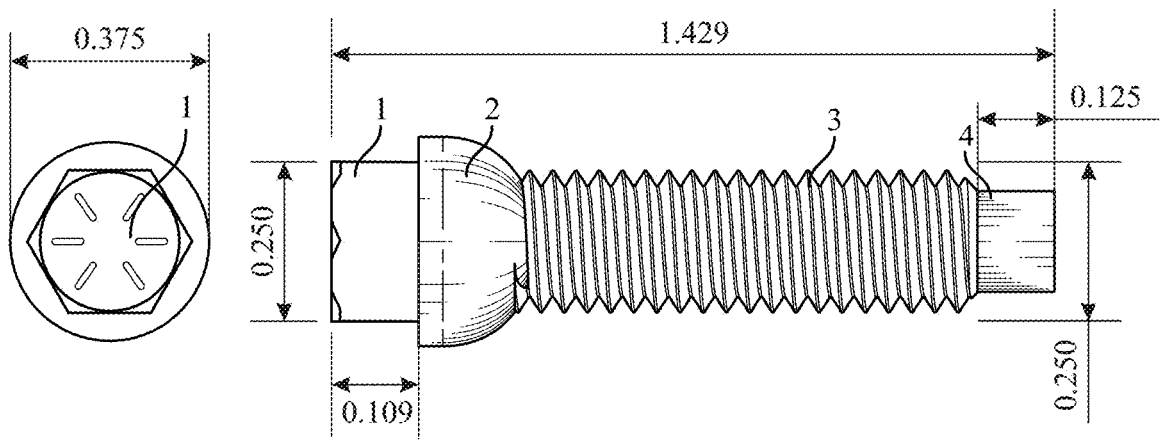
FIG. 5a and FIG. 5b show a side view of a ¼" bolt according to one embodiment of the invention.
Figure 5B:
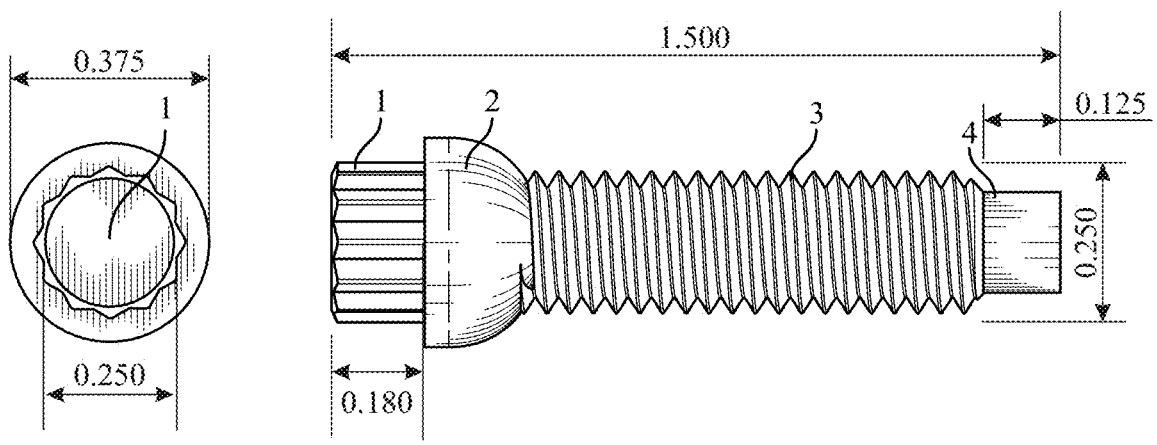

Referring now to the invention in FIG. 5a and FIG. 5b is a ¼" bolt according to one embodiment of the invention, showing two types of heads 1 the ball seat 2, the thread 3, and the bolt pilot 4. The head 1 in FIG. 5a is different from the head 1 of FIG. 5b. As shown in the FIG. 5a and FIG. 5b, the ¼" bolt is 1.492" and 1.5" long respectively, the head 1 is 0.180 in length and 0.375" in diameter, the diameter of the thread 3 is 0.250" and the bolt pilot 4 is 0.125" in length.

According to one embodiment of the invention, the density of threads per inch of ¼" bolt is 20. In some embodiment of the invention, the density of threads per inch of ¼" bolt is 28, but other thread densities are contemplated as part of this invention, in particular ⁵⁄₁₆-18, ⁵⁄₁₆-24, ⅜-16, and ⅜-24.

Figure 6A:
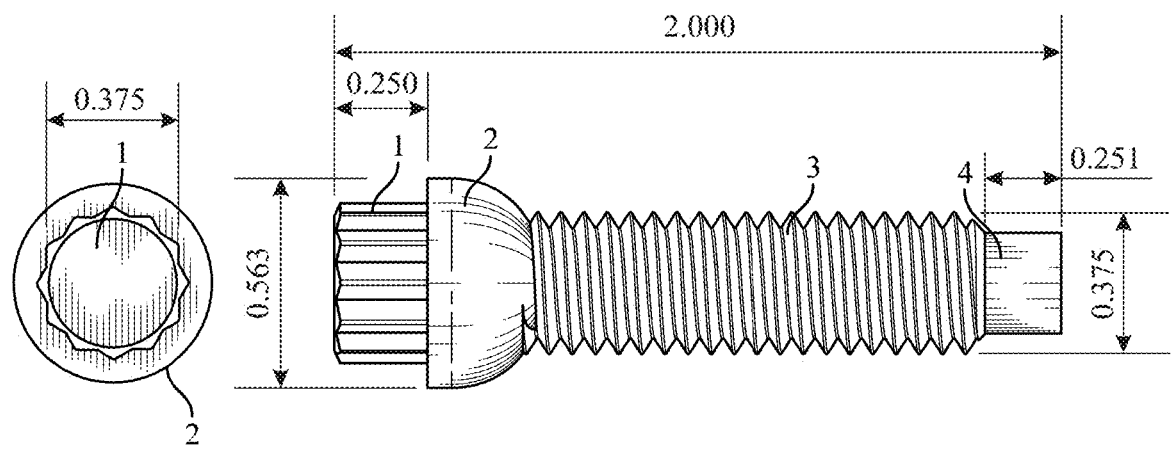
FIG. 6a and FIG. 6b show a side view of a ⅜" bolt according to one embodiment of the invention.
Figure 6B:
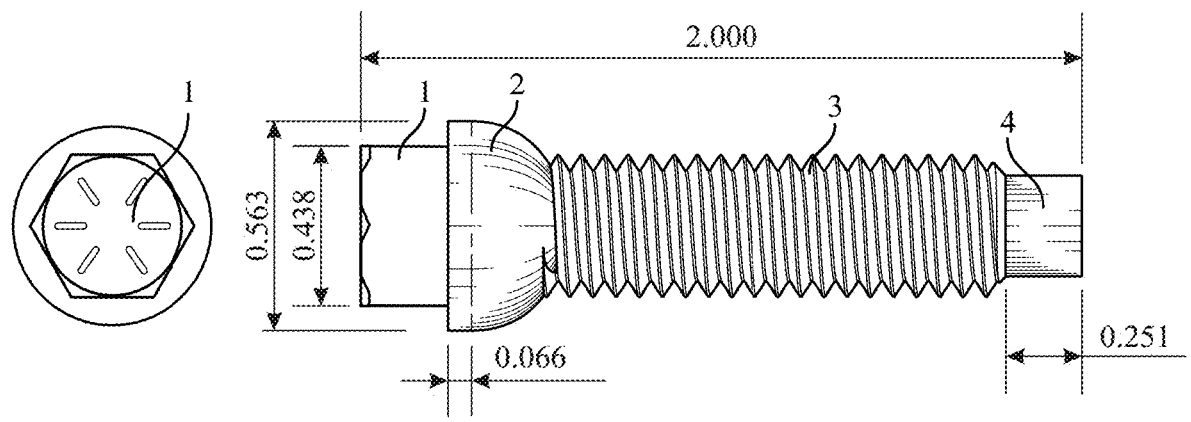

Similarly, referring now to the invention in FIG. 6a and FIG. 6b is a ⅜" bolt according to one embodiment of the invention, showing two types of heads 1, the ball seat 2, the thread 3, and the bolt pilot 4. As shown in the FIG. 6a and FIG. 6b, the ⅜" bolt is 2.0" long, the head 1 is 0.250 in length and 0.563" in diameter, the diameter of the thread 3 is 0.375" and the bolt pilot 4 is 0.251" in length.

According to one embodiment of the invention, the density of threads per inch of ⅜" bolt is 16. In some embodiment of the invention, the density of threads per inch of ⅜" bolt is 24.

Figure 7A:
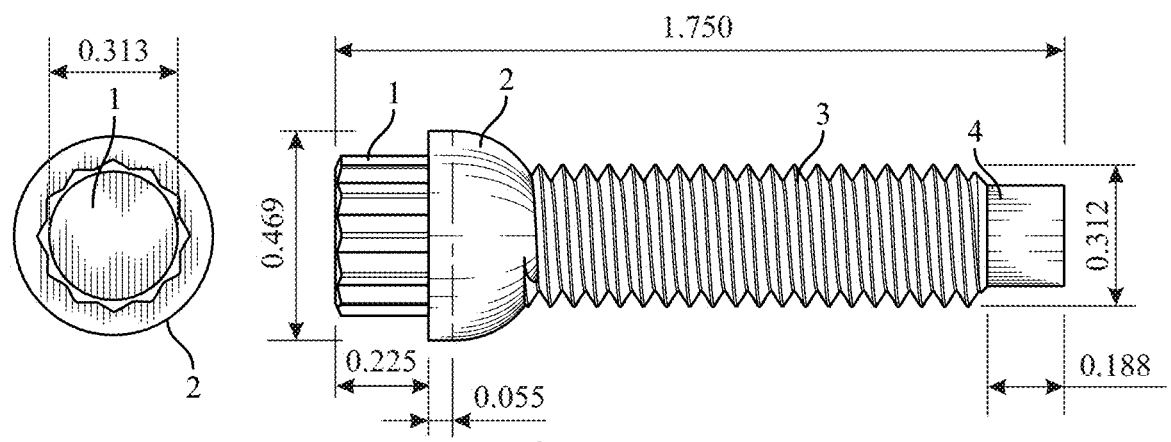
FIG. 7a and FIG. 7b show a side view of a 5/16" bolt according to one embodiment of the invention.
Figure 7B:
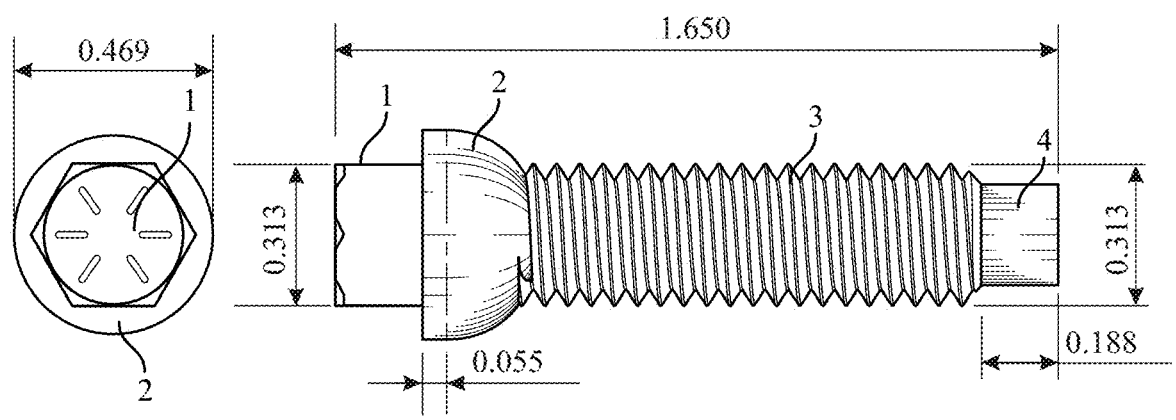

Similarly, referring now to the invention in FIG. 7a and FIG. 7b is a ⁵⁄₁₆" bolt according to one embodiment of the invention, showing two types of heads 1, the ball seat 2, the thread 3, and the bolt pilot 4. As shown in the FIG. 7a and FIG. 7b, the ⁵⁄₁₆" bolt is 1.750" and 1.650" long respectively, the head 1 is 0.225 in length and 0.469" in diameter, the diameter of the thread 3 is 0.313" and the bolt pilot 4 is 0.188" in length.

According to one embodiment of the invention, the density of threads per inch of ⁵⁄₁₆" bolt is 18. In some embodiment of the invention, the density of threads per inch of ⁵⁄₁₆" bolt is 24.

Further provides a ⁷⁄₁₆" bolt (Not shown in figure) according to an alternative embodiment of the invention. The density of threads per inch of ⁷⁄₁₆" bolt is 14.

Further provides a ½" bolt (Not shown in figure) according to an alternative embodiment of the invention. The density of threads per inch of ½" bolt is 13. In some embodiment of the invention, the density of threads per inch of ½" bolt is 20.

Figure 10:
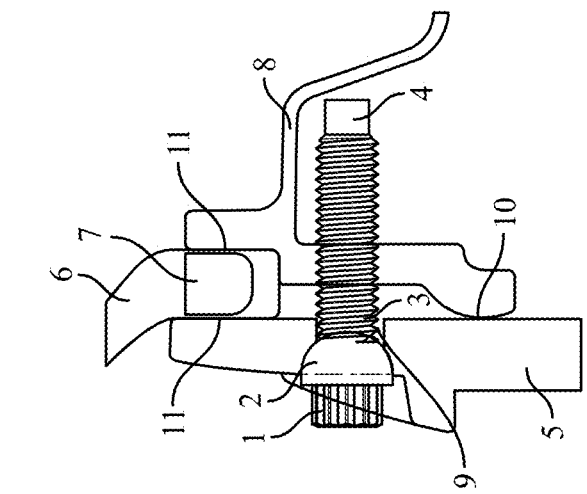
FIG. 10 is a side view of the invention at the end of the beadlock tightening process.
Figure 9:
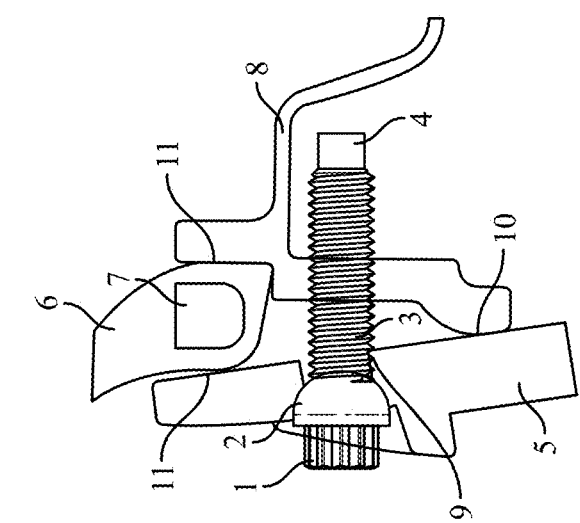
FIG. 9 is a side view of the invention in the middle of the beadlock tightening process.
Figure 8:
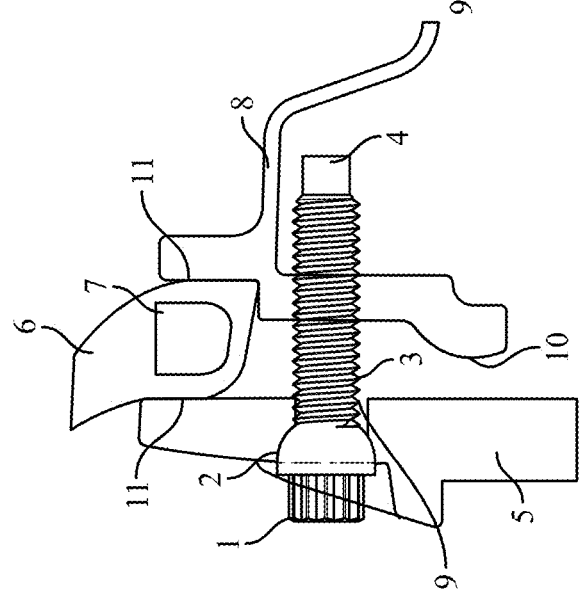
FIG. 8 is a side view of the invention at the beginning of the beadlock tightening process.

Referring now to the invention in FIG. 8, FIG. 9 and FIG. 10 this sequence of figures illustrates the beadlock tightening process.

FIG. 8 is a side view of the invention at the beginning of the tightening process. It can be seen that in the initial engagement, the threads 3 of the bolt is engaged with threads section in the wheel 8. The ball seat 2 of the bolt is nestled in the bead ring seat (better shown in 12 of FIG. 13) of the bead ring 5. The bolt is in a 90 degree vertical configuration, so that a bit of space in the enlarged pilot hole 9, which will allow the bead ring 5 to pivot slightly around the bolt as the bead ring 5 is tightened against the wheel 8. As the tire have a tire bead 6 and a tire bead bundle 7. The tire bead 7 is made of metal or some other non-compressible material. Tire bead compressors 11 are on above and below the tire bead bundle 7, which will eventually be compressed between the wheel 8 and the bead ring 5 for sealing the tire bead bundle 7. It the goal of a bead lock to put enough pressure on the tire bead compressors 11, such that no air can escape from the inside of the tire, and that the tire is secured to the wheel.

FIG. 9 is a side view of the invention in the middle of the tightening process. It can be seen that the bolt head 1 has been rotated, cause the bolt thread 3 to further engage the mating thread holes of threaded section in the wheel. This has pulled the bead ring 5 down toward the wheel 8. There is not yet enough force to compress the tire bead compressors 11, so the bead ring 5 rotates slightly in the bead ring seat (better shown in 12 of FIG. 13) until a pivot point or fulcrum 10 is contacted, which creates a fulcrum with the bead ring 5 contacting the wheel 8. The bolt in this figure has been further screwed into the wheel 8, and the bead ring 5 has pivoted slightly, in a preferred embodiment approximately 4 degrees, around the bolt, as the bolt maintains a direct, 90-degree angle with the threads in the wheel 8. This prevents part of the bolt head 1 from undergoing undesirable stress as the entire head 1 is not uniformly pressing down on the bead ring 5. The enlarged pilot hole 9 now shows no gap, as that gap has been filled by the thread 3 as the bolt pivots, but rather, a gap appears on the opposite side of the bead ring.

FIG. 10 is a side view of the invention at the end of the tightening process. The tire is squeezed and approximately 0.0125" rubber remains on each side of tire bead 6. Upon hitting the fulcrum 10, the bead ring 5 leverages the pressure from the bolt as the bolt is further tightened, and begins to put pressure on the tire bead compressors 11 against the tire bead bundle 7. Since the tire bead bundle 7 is not compressible, the tire beach compressors 11 get flattened to effectively both seal air inside in the tire and to prevent the tired bead core 7 from escaping its confinement between the bead ring 5 and the wheel 8. Because of the use of the fulcrum 10, tires of various thicknesses can be used on the same wheel without a decrease in the security of the lock between the wheel 8 and the bead ring 5.

Figure 11C:
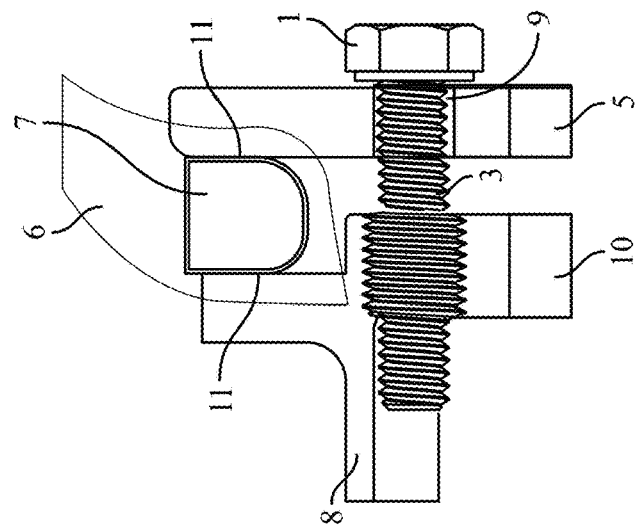
FIG. 11a, FIG. 11b and FIG. 11c show side view of another embodiment of the invention with enlarged holes in the bead ring.
Figure 11B:
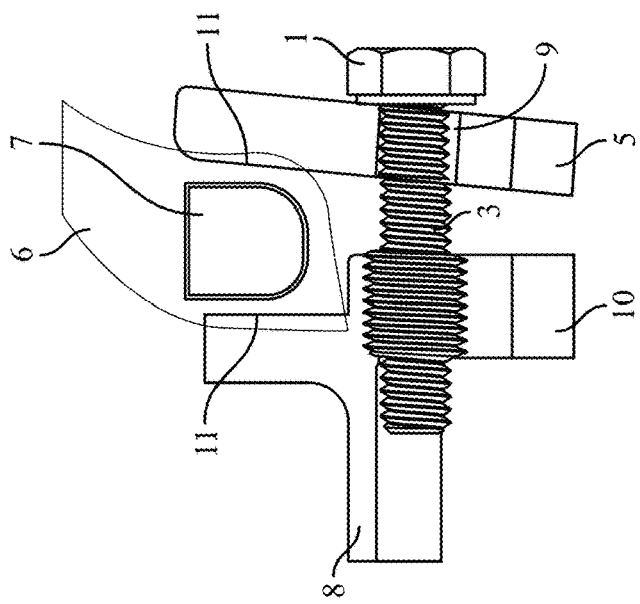
Figure 11A:
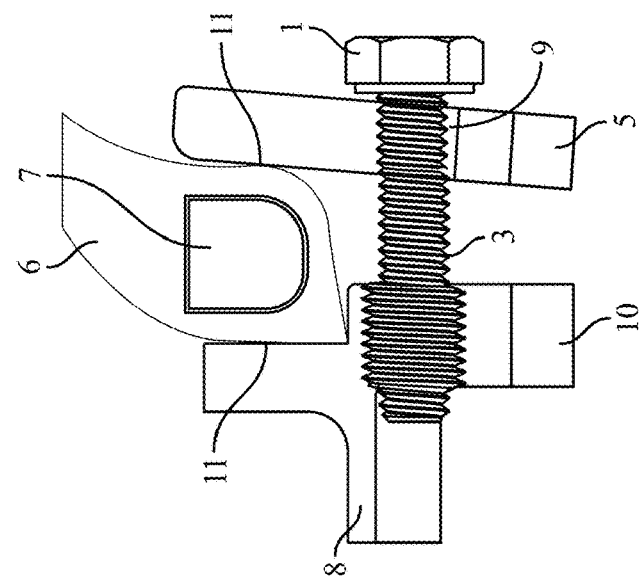

FIG. 11*a*, FIG. 11*b* and FIG. 11*c* show side view of the invention in steps of securing tire bead 7 through the enlarged pilot whole 9 and allowing the bead ring 5 to pivot slightly around the bolt as the bead ring 5 is tightened against the wheel 8. Because of the enlarged pilot hole 9 in the bead ring 5, the bolt is not unduly stressed because the bead ring 5 can pivot about the bolt, although it would cause less stress had the bolt had a ball seat, as is illustrated in FIGS. 8, 9 and 10.

Figure 12:
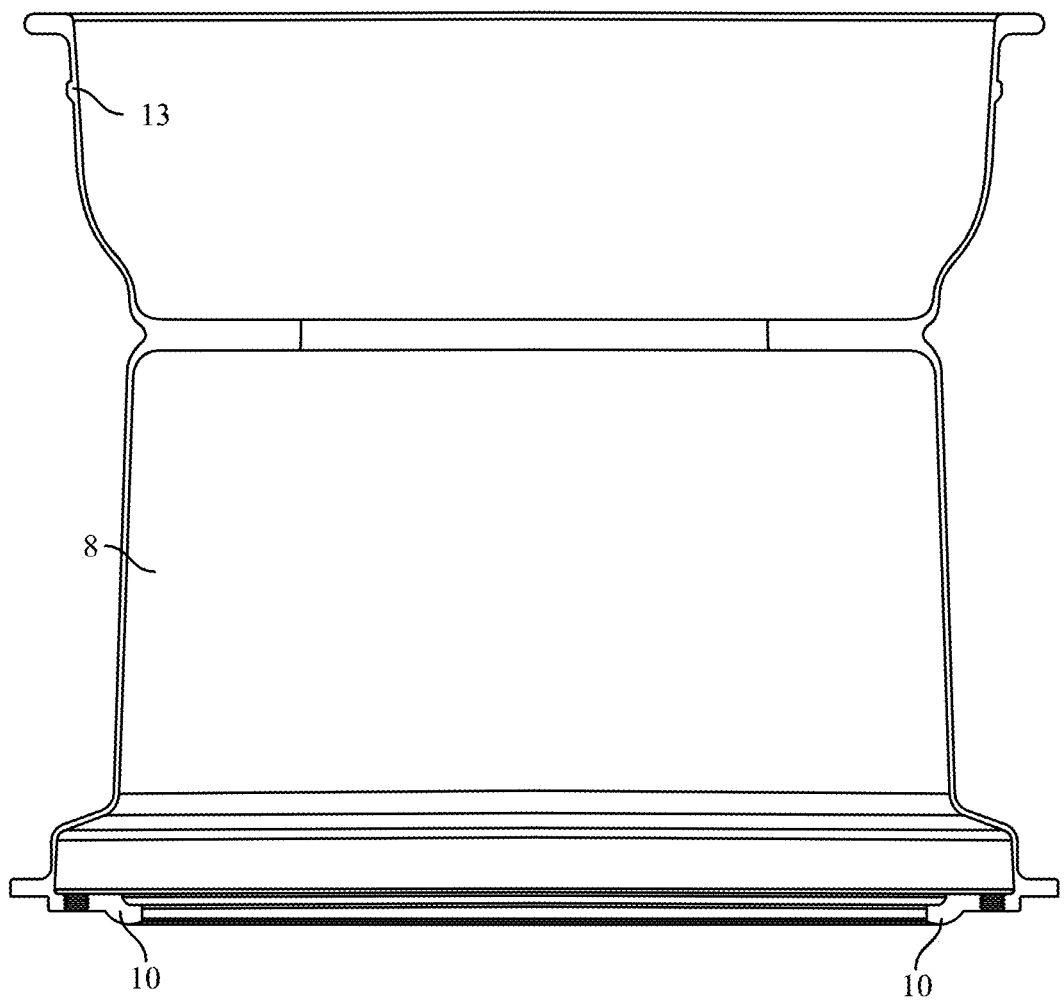
FIG. 12 is a side view of a wheel showing the location of the fulcrum.

FIG. 12 is a side view of a wheel 8 showing the location of the fulcrum 10 and the safety bead 13. The barrel of the wheel 8 has a safety bead 13 that prevents the inner side of the tire from moving away from the inner rim of the wheel 8. The gap between the safety bead 13 and the inner wall has an RA coating on it that prevents the tire from slipping along the wheel 8 as the tire revolutions are quickly increased or decreased as it often the case in auto racing.

Figure 13:
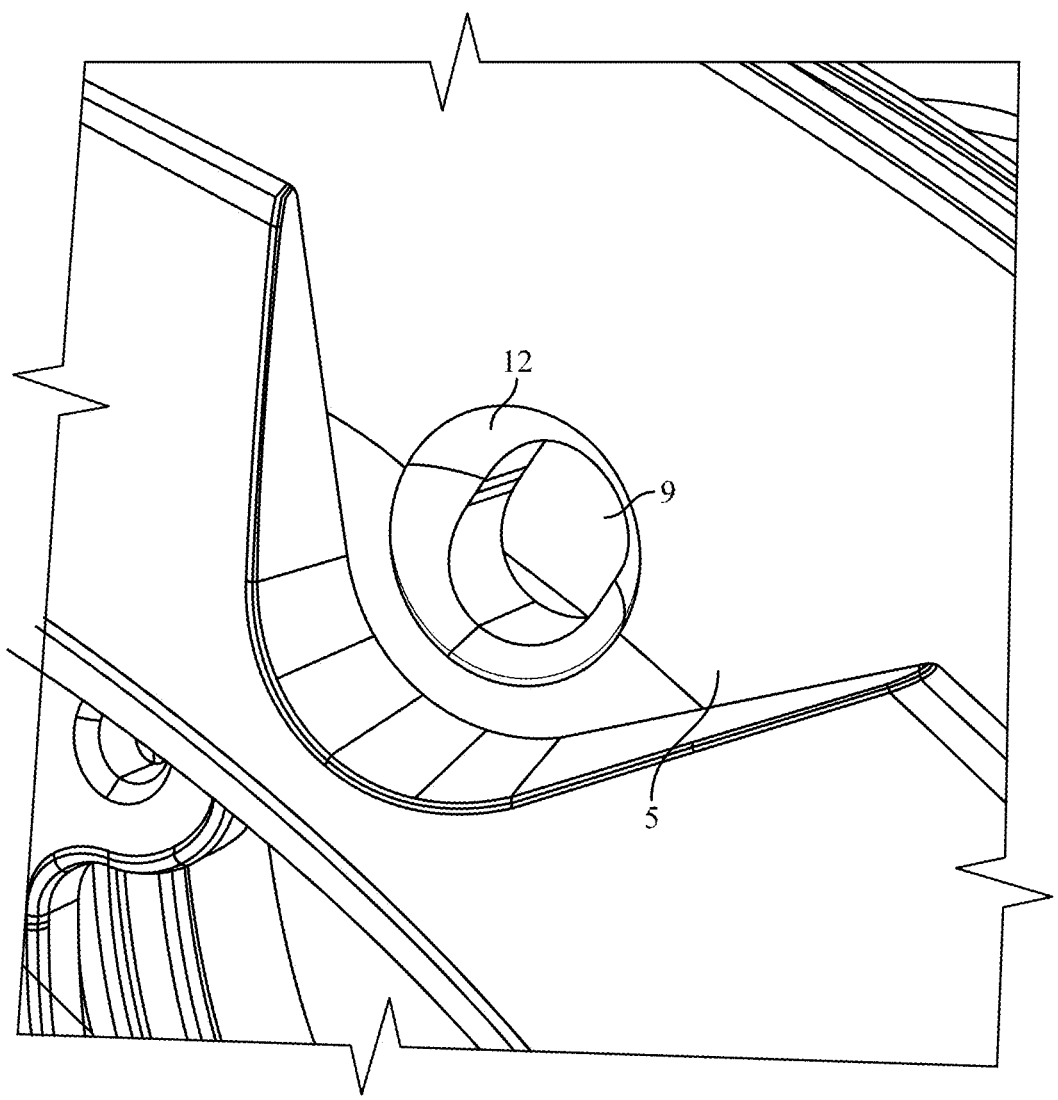
FIG. 13 is a perspective view of a bead ring with a bead ring seat.

FIG. 13 is a perspective view of a bead ring 5 with a bead ring seat 12 and an enlarged pilot hole 9. It can be seen that the enlarged pilot hole 9 is not circular, but rather elongated, or "racetrack" shaped such that the bead ring 5 can pivot around the bolt, but only along a single axis. This design is very useful in minimizing stress on the bolt as it pulls the bead lock against the wheel.

Figure 14C:
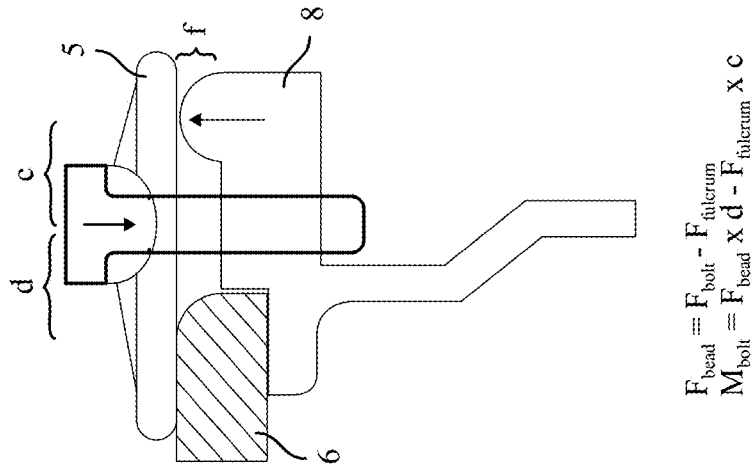
FIG. 14a, FIG. 14b and FIG. 14c show beadlock designs of a prior arts and beadlock design of the current invention comparing their effectiveness.
Figure 14B:
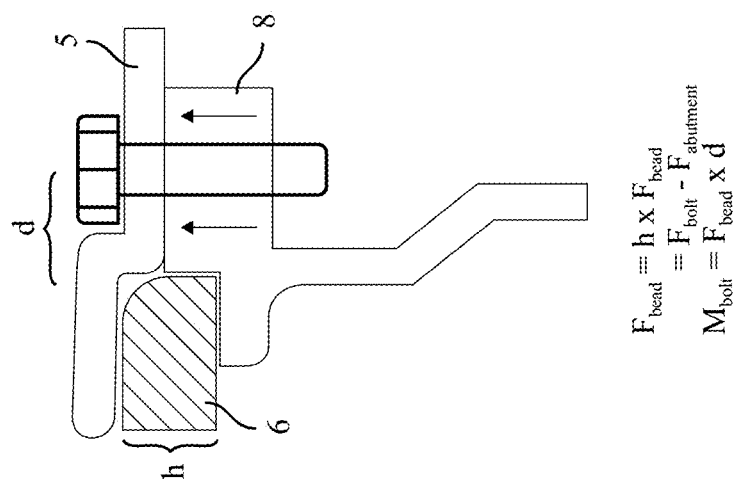
Figure 14A:
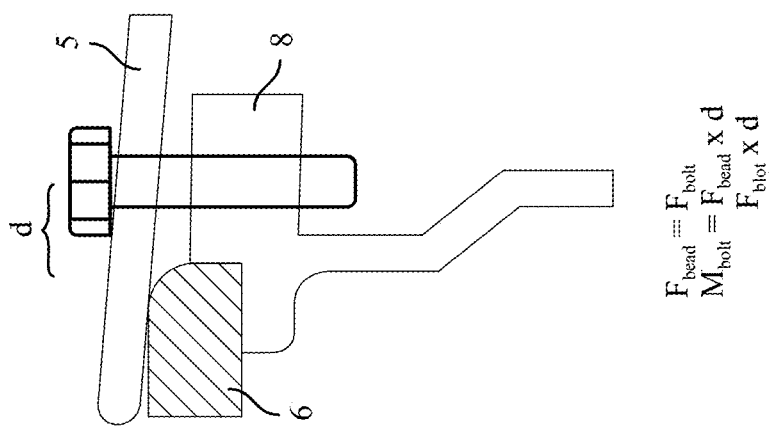

FIG. 14*a* and FIG. 14*b* are beadlock designs of two prior arts and FIG. 14*c* is beadlock design of the current invention comparing their effectiveness. FIG. 14*a* is a prior art beadlock design and it can be seen that the bead ring 5 is pulled down at an angle against the tire bead 6 and the wheel 8. This result in the bottom of the bolt head 1 digging into the top of the bead ring 5, causing binding up to 20 foot pounds and substantial stress upon the bolt head. Indeed, the asymmetrical pressure on the bead ring 5 quickly leads to deformation of the bead ring 5, such that when tires are replaced in the future, it is even more difficult to achieve a strong seal. This commonly leads to bolts snapping or the bolt heads shearing off, either of which can result in catastrophic failure.

As shown in FIG. 14*a*, where a significant amount of force on the bolt head is applied, the bolt can be broken or bent at installation. As it is shown in formula, when $F_{bead}=F_{bolt}$ then torque on the bolt becomes $M_{bolt}=F_{bead}\times d$ and $M_{bolt}=F_{bolt}\times d$ (where $F_{bead}$=Force on bead, $F_{bolt}$=Force on bolt, $M_{bolt}$=Moment (or torque) on the bolt and d=perpendicular distance). Further it is apparent that the erratic bead force is applied on the bolt due to which bead ring galling is occurred and incorrect torque reading may be obtained. Further, the force applied on the bead ring 5 is at incorrect angle, therefore significant deformation on the bead ring 5 is seen after some uses.

FIG. 14*b* is another prior art bead lock design which shows how the bead ring 5 has an elevated section which creates a cavity into which the tire bead 6 nestles, that once the bolt has been tightened into the threaded hole in the wheel 8, the pressure of the tire bead 6 is at its maximum. Further it shows that the erratic bead force is applied on the bolt due to which bead ring galling is occurred and incorrect torque reading may be obtained. Further, the force applied on the bead ring 5 is at incorrect angle, therefore significant deformation on the bead ring 5 is seen after some uses. As it is shown in formula, when $F_{bead}=h\times K_{bead}$ which is also $F_{bead}=F_{bolt}-F_{abutment}$) then torque on the bolt becomes $M_{bolt}=F_{bead}\times d$ (where $F_{bead}$=Force on bead, $F_{bolt}$=force on bolt, $M_{bolt}$=Moment (or torque) on the bolt, d=perpendicular distance, h is height of the tire bead and $K_{bead}$ is compression).

FIG. 14*c* is bead lock design of the current invention shows how the pivoting bead ring 5 combined with the fulcrum 10 on the wheel 8 allows for tighter seal on the tire bead 6 by the wheel 8 and bead ring 5. As shown in FIG. 14*c*, it shows increasing rate of bead force. Further, the bolt force splits between bead ring and fulcrum. It maximizes load transfer. Ball seat 2 and bead ring 5 design compensates for angular errors, no galling, proper bolt torque is provided. Which is further explained in formula, where $F_{bead}=F_{bolt}-F_{fulcrum}$ and then torque on the bolt is $M_{bolt}=F_{bead}\times d-F_{fulcrum}\times c$ (where $F_{bead}$=Force on bead, $F_{bolt}$=force on bolt, $F_{fulcrum}$=force on fulcrum $M_{bolt}$=Moment (or torque) on the bolt, d=perpendicular distance, c=perpendicular distance and f=fulcrum displacement).

Figure 15:
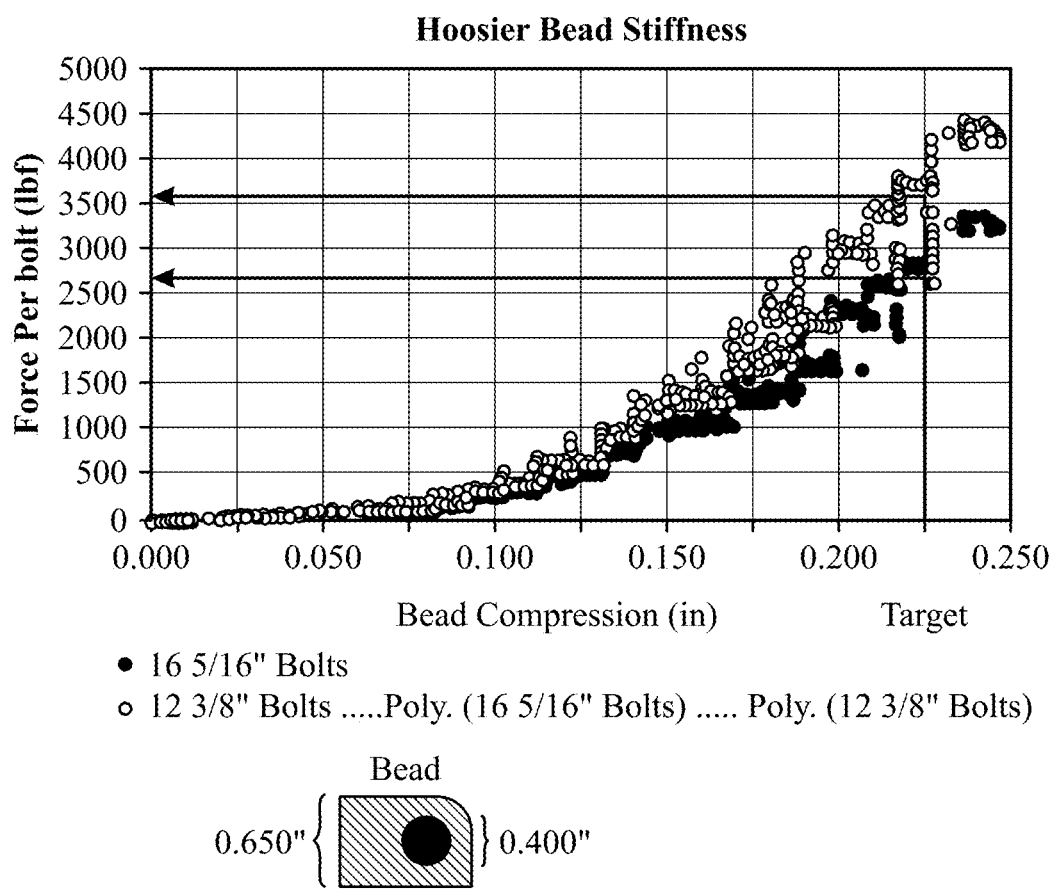
FIG. 15 is a chart illustrating the extra torque put on bolt heads according to the designs of the prior art.

FIG. 15 is a chart illustrating the extra torque put on bolt heads according to the designs of the prior art. At varying amounts of bead compression (X axis) the darker circles represent bolt failure at increasing amounts of force for the prior art, with the lighter circles representing the failure points for this invention. As can be seen, for the most common amounts of bead compression, the current invention allows the bolt to take 1,000 pounds or more extra pressure above what a bolt in a prior art wheel/bead ring could take before failing.

Figure 16B:
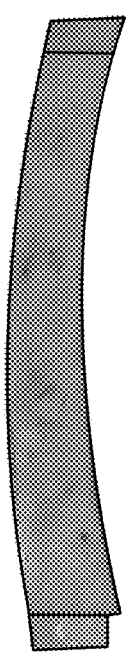
FIG. 16a, FIG. 16b, FIG. 16c, FIG. 16d and FIG. 16e are an illustration of the Pressure Film Test Results.
Figure 16D:
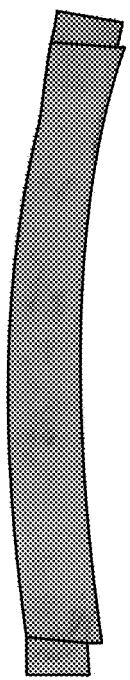
Figure 16A:
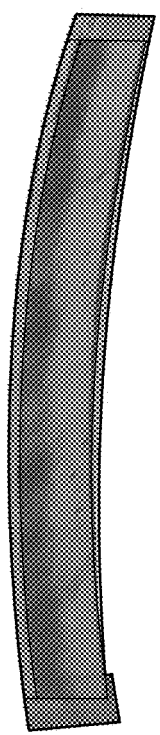
Figure 16C:
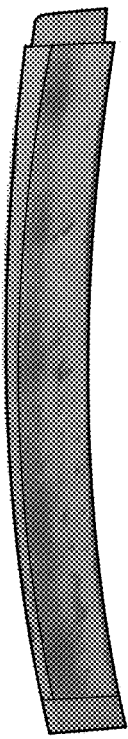
Figure 16E:
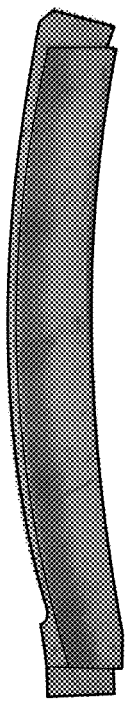

FIG. 16*a*, FIG. 16*b*, FIG. 16*c*, FIG. 16*d* and FIG. 16*e* show the Pressure Film Test Results. FIG. 16*a* and FIG. 16*b* show how a traditional new bead ring/wheel/bolt combination, FIG. 16*c* and FIG. 16*d* show how it loses clamping force over time with more uses, because of ring deformation, while in FIG. 16*e* is the current invention shows no loss of force over more uses.

Figure 17:
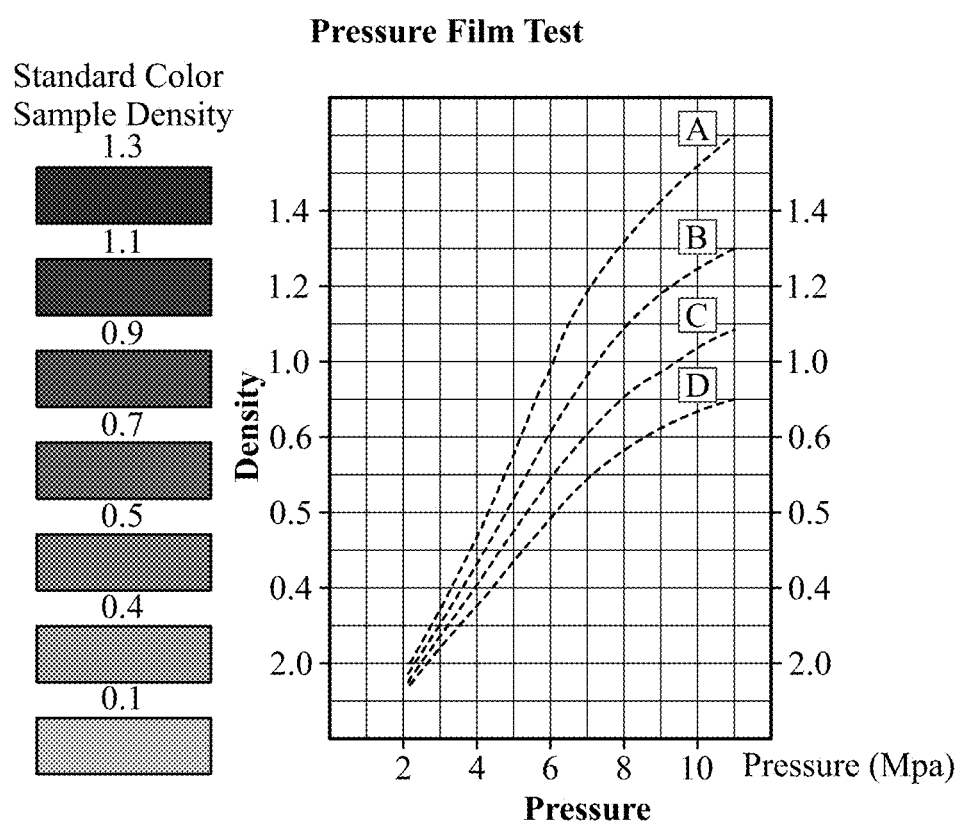
FIG. 17 shows the results of a Pressure Film Tests on various prior arts and the current invention.

FIG. 17 shows the results of a Pressure Film Tests on various prior arts and the current invention, where the pressure film test shows the amount of clamp force.

Figure 18A:
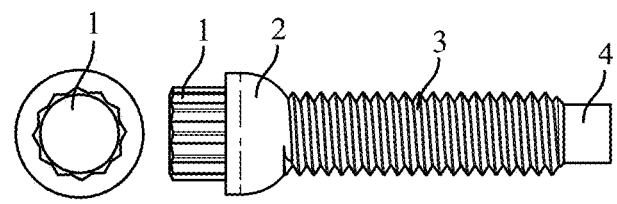
FIG. 18a, FIG. 18b, FIG. 18c and FIG. 18d are several alternative designs of one embodiment of the invention.
Figure 18B:
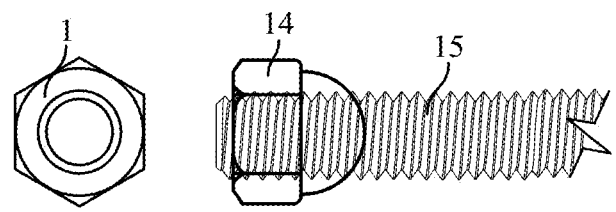
Figure 18C:
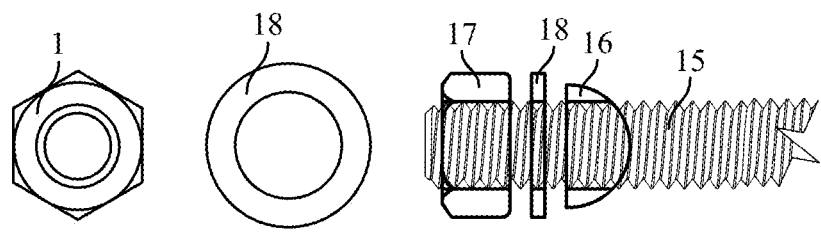
Figure 18D:
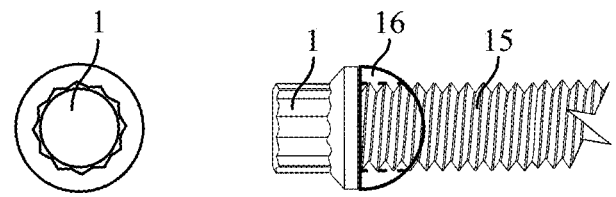

FIG. 18*a*, FIG. 18*b*, FIG. 18*c* and FIG. 18*d* illustrate several alternative embodiments of the invention. FIG. 18*a* is side view of the ⅜" bolt, having 12 points on the head 1, the ball seat 2, the thread 3 and the pilot hole 4. FIG. 18*b* is side view of the ⅜' bolt having a Dome Nut 14 on a stud 15. FIG. 18*c* is side view of the ⅜' bolt with a Dome washer 16, a Nut 17 and a washer 18 on a stud 15. FIG. 18*d* is side view of the ⅜' bolt with a Dome washer 16.

Figure 19A:
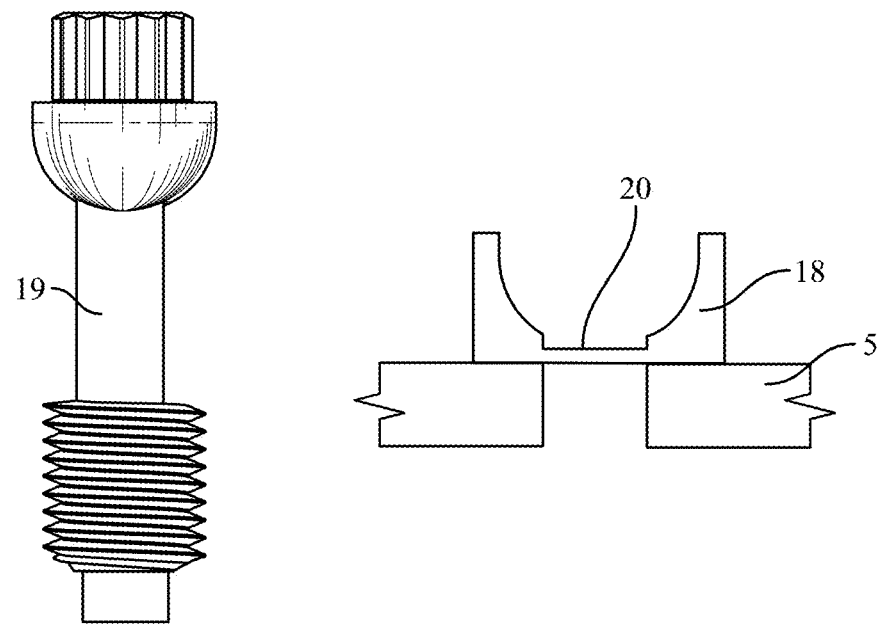
FIG. 19a and FIG. 19b are perspective views of a second embodiment of the invention, where a washer with a washer seat has been attached to a bead ring.

FIG. 19*a* is a perspective view of a second embodiment of the invention showing a bolt with non-threaded section 19 for pivoting in a bead ring 5, where a washer 18 with a washer seat 20 has been attached to a bead ring 5.

Figure 19B:
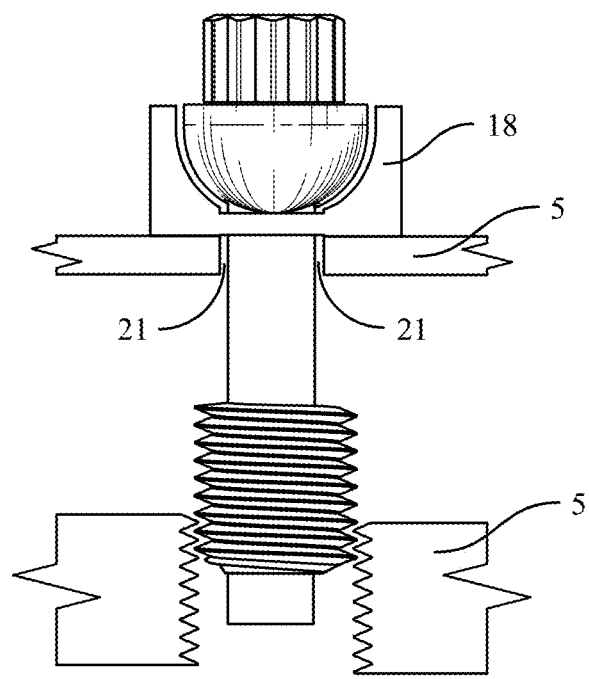

FIG. 19*b* is a perspective view of another embodiment of the invention showing a bolt with non-threaded section 19 is pivoted with the bead ring 5, where a washer 18 with a washer seat 20 has been attached to a bead ring 5 creating a pivot room 21. Because the washer 18 has a ball seat 2 be used to pivotally secure the bead ring 5 over the tire bead bundle 7 against the wheel 8.

Figure 20:
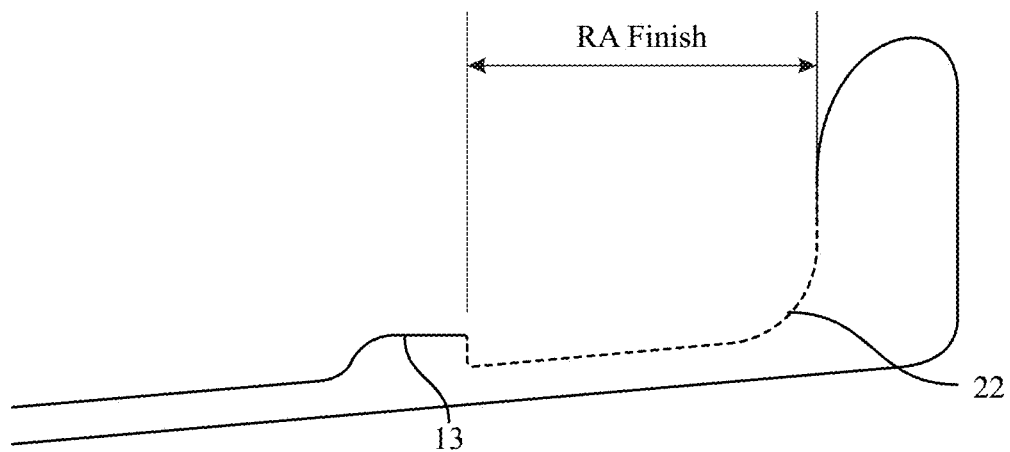
FIG. 20 is a side view of the safety bead and non-skid application.

FIG. 20 is a side view of the safety bead 13 and non-skid application. The invention additionally comprises a safety bead 13 on the barrel of the wheel close to the inner rim. This prevents the tire from moving toward the center of the wheel, a problem particularly acute with low psi tires such as those found on sprint cars and dragsters. In between the safety bead and the inner rim, an RA finish 22 is created, to prevent the tire from sliding around the wheel as the car accelerates or decelerates. By preventing the tire from sliding around the wheel or moving away from the rim, the combination of the safety bead and the RA finish 22 avoids the potentially catastrophic failures caused by over-stressing the sides of the tire and/or a sudden imbalance of the tire on the wheel.

Figure 21:
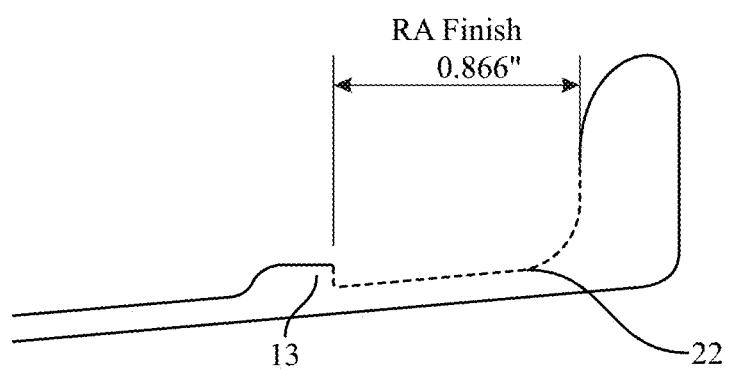
FIG. 21 is a side view of a preferred embodiment of the FIG. 20.

FIG. 21 shows side view of a preferred embodiment of FIG. 20 with the safety bead 13 and the RA finish for non-skid application. For an exemplary embodiment, the RA finish 22 is 0.866" provided for 14" rim width.

In particular, it is noted that the same function can be completed by both the "bolt" and "washer" version of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Head, bolt head.
2. Ball seat
3. Thread
4. Bolt pilot
5. Bead ring
6. Tire bead
7. Tire bead bundle
8. Wheel
9. Enlarged pilot hole
10. Fulcrum
11. Tire bead compressor
12. Bead ring seat
13. Safety Bead
14. Dome Nut
15. Stud
16. Dome washer
17. Nut
18. Washer
19. Non-threaded section
20. Washer seat
21. Pivot room
22. RA finish

What is claimed:

1. A combination for attaching a tire to a wheel, comprising: a wheel, where the wheel has a threaded section,
a bead ring, where the bead ring has a bead ring seat and an elongated pilot hole, and
a bolt, where the bolt has a head, a ball seat, a thread and bolt pilot, where the ball seat mates with the bead ring seat and the elongated pilot hole in the bead ring is elongated greater than the diameter of the thread of the bolt allowing the bead ring to pivot several degrees on either side of the bolt as the bolt's thread engage the wheel's thread section,
wherein the wheel additionally comprises a safety bead on a barrel of the wheel close to an inner rim flange of the wheel.

2. The combination of claim 1, where the bead ring seat has a bead ring seat shape, and the bead ring seat shape is racetrack shaped, where the bolt ball seat nestles with the bead ring ball seat and the elongated pilot hole in the bead ring, allowing the bead ring to pivot around the bolt when the bolt tightens the bead ring against the wheel, where the thread of the bolt engages with threaded section of the wheel, the wheel having a fulcrum to increase clamp load pressure on a tight tire seal between the bead ring and the wheel, when the fulcrum touches the bead ring, where the bead ring and the wheel retain a tire with a tire bead bundle, where the tire bead bundle is retained between the bead ring and the wheel.

3. The combination of claim 2, where the head of the bolt has a shape, and the shape is hexagonal.

4. The combination of claim 2, where the head has a number of sides, and the number of sides is greater than 3.

5. The combination of claim 2, where the thread of the bolt has a thread diameter.

6. The combination of claim 5, where the thread diameter is ¾".

7. The combination of claim 5, where the thread diameter is ⅜".

8. The combination of claim 5, where the thread diameter is 5/16".

9. The combination of claim 2, where the thread of the bolt has a thread density.

10. The combination of claim 9, where the density of threads per inch is minimum 20 and maximum 28 for a thread diameter of ¾".

11. The combination of claim 9, where the density of threads per inch is minimum 16 and maximum 24 for a thread diameter of ⅜".

12. The combination of claim 9, where the density of threads per inch is minimum 18 and maximum 24 for a thread diameter of 5/16".

13. The combination of claim 9, where the density of threads per inch is 14 for a thread diameter of 7/16".

14. The combination of claim 9, where the density of threads per inch is minimum 13 and maximum 20 for a thread diameter of ½".

15. A composition for attaching a tire to a wheel, comprising;
a wheel, where the wheel has a threaded section,
a bead ring, where the bead ring has a bead ring seat and an enlarged pilot hole,
a bolt, where the bolt has a head, a bolt ball seat, a thread and a bolt pilot, where the ball seat mates with the bead ring seat and the enlarged pilot hole in the bead ring is enlarged greater than the diameter of the thread of the bolt allowing the bead ring to pivot several degrees on either side of the bolt as the bolt's thread engage the wheel's thread section, and
a tire, where the tire has a tire bead and a tire bead bundle, where the ball seat nestles in the bead ring seat and the enlarged pilot hole in the bead ring, and, firstly, the thread of the bolt engages the threaded section, the head is rotated to further pull the bead ring toward the wheel, where the tire bead and the tire bead bundle extend into a gap between the wheel and the bead ring, where, secondly, as the head is further rotated, the tire bead is compressed between the bead ring and the wheel, where eventually the wheel contacts the bead ring at a fulcrum, where the enlarged pilot hole allows the bead ring to pivot around the bolt as an angle between the bead ring and the wheel changes, where, thirdly, after a pivot point is reached, further tightening of the head causes the bead ring and the wheel to further compress the tire bead through leverage, where, fourthly, the bead ring and the wheel put more pressure on tire bead compressors on either side of the tire bead bundle, such that the tire is effectively sealed within a gap between the tire bead and the wheel, wherein the tire bead compressors are on above and below the tire bead bundle, which will eventually be compressed between the wheel and the bead ring for sealing the tire bead bundle, where the tire bead compressors are parts of the tire which put pressure against the tire bead bundle during attachment of the tire to the wheel.

16. The composition of claim 15, where the head has a shape, and the shape is selected from the group consisting of hexagonal and 12 point.

17. The composition of claim 15, where the bead ring seat has a bead ring seat shape, and the bead ring seat shape is racetrack shaped.

18. A composition for attaching a tire to a wheel, comprising a wheel, a bead ring, a washer, a bolt and a tire, where the bolt has a head, a ball seat, a thread and bolt pilot where the washer has a washer seat attached to the bead ring to pivotally secure the bead ring over the tire against the wheel, wherein the wheel additionally comprises a safety bead on a barrel of the wheel close to an inner rim flange of the wheel, and where the ball seat mates with the washer seat of the washer and a pilot hole in the bead ring is enlarged greater than the diameter of the thread of the bolt allowing the bead ring to pivot several degrees on either side of the bolt as the bolt's thread engage the wheel's thread section.

19. The composition of claim 18, where the wheel additionally comprises a fulcrum, against which the bead ring is leveraged.

20. The composition of claim 18, where the safety bead prevents an inner side of the tire from moving away from an inner wall of the wheel or sliding around the wheel.

\* \* \* \* \*